United States Patent
Kim et al.

(10) Patent No.: US 8,015,610 B2
(45) Date of Patent: Sep. 6, 2011

(54) INTRUSION DETECTION APPARATUS AND METHOD USING PATTERNS

(75) Inventors: Jae Deok Kim, Daejeon (KR); Young Ho Kim, Daejeon (KR); Seung Ho Ryu, Daejeon (KR); Bo Heung Chung, Daejeon (KR); Ki Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 859 days.

(21) Appl. No.: 11/829,935

(22) Filed: Jul. 29, 2007

(65) Prior Publication Data

US 2008/0034433 A1    Feb. 7, 2008

(30) Foreign Application Priority Data

Aug. 1, 2006   (KR) .................. 10-2006-0072649

(51) Int. Cl.
   *G06F 11/30*    (2006.01)
   *G06F 12/14*    (2006.01)
   *G06F 12/16*    (2006.01)
   *G06F 15/173*   (2006.01)
   *G08B 23/00*    (2006.01)

(52) U.S. Cl. .............. 726/23; 726/25; 709/224
(58) Field of Classification Search ............ 726/23, 726/25
   See application file for complete search history.

(56) References Cited

U.S. PATENT DOCUMENTS

| | | | | |
|---|---|---|---|---|
| 6,279,113 | B1* | 8/2001 | Vaidya | 726/23 |
| 6,959,297 | B2* | 10/2005 | Oh et al. | 1/1 |
| 7,359,962 | B2* | 4/2008 | Willebeek-LeMair et al. | 709/223 |
| 7,424,744 | B1* | 9/2008 | Wu et al. | 726/23 |
| 7,499,412 | B2* | 3/2009 | Matityahu et al. | 370/255 |
| 7,602,731 | B2* | 10/2009 | Jain | 370/252 |
| 7,681,235 | B2* | 3/2010 | Chesla et al. | 726/23 |
| 7,703,138 | B2* | 4/2010 | Desai et al. | 726/23 |
| 2004/0193943 | A1* | 9/2004 | Angelino et al. | 714/4 |
| 2006/0191008 | A1* | 8/2006 | Fernando et al. | 726/23 |
| 2007/0067841 | A1* | 3/2007 | Yegneswaran et al. | 726/23 |
| 2007/0180527 | A1* | 8/2007 | Yeom | 726/23 |
| 2007/0192863 | A1* | 8/2007 | Kapoor et al. | 726/23 |
| 2007/0233628 | A1* | 10/2007 | Sherwood et al. | 706/46 |
| 2007/0289013 | A1* | 12/2007 | Lim | 726/22 |

FOREIGN PATENT DOCUMENTS

| | | | |
|---|---|---|---|
| KR | 2002-0072618 | * | 9/2002 |
| KR | 10-2006-0007581 | * | 1/2006 |

* cited by examiner

*Primary Examiner* — Nathan Flynn
*Assistant Examiner* — Carolyn B Kosowski

(57) ABSTRACT

An intrusion detection apparatus includes: a rule generator classifying intrusion detection rules into rules having content examination parts and rules without content examination parts, granting an index to each of the rules so as to output the indices to a unit for performing the matching and to simultaneously store the indices; an extractor extracting payload parts and address parts from the packets and outputting the extracted payload parts and address parts to the unit; and an examination unit examining corresponding rules based on the indices.

13 Claims, 5 Drawing Sheets

FIG. 6
1. IPv4 RULE
   - SOURCE ADDRESS : 10.1.1.0 NETMASK 255.255.255.0
   - DESTINATION ADDRESS : 30.1.0.0 NETMASK 255.255.0.0
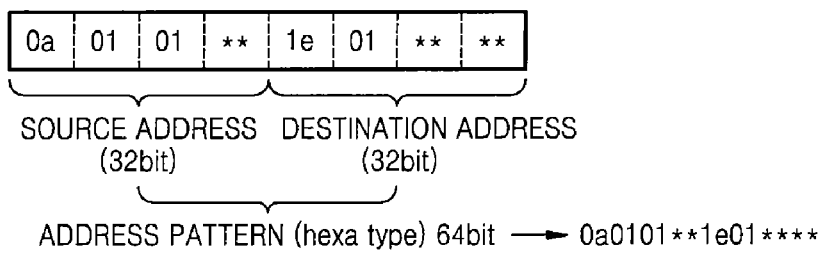
2. IPv6 RULE
   - SOURCE ADDRESS : 2005::a112/120
   - DESTINATION ADDRESS : 2005::b412/112
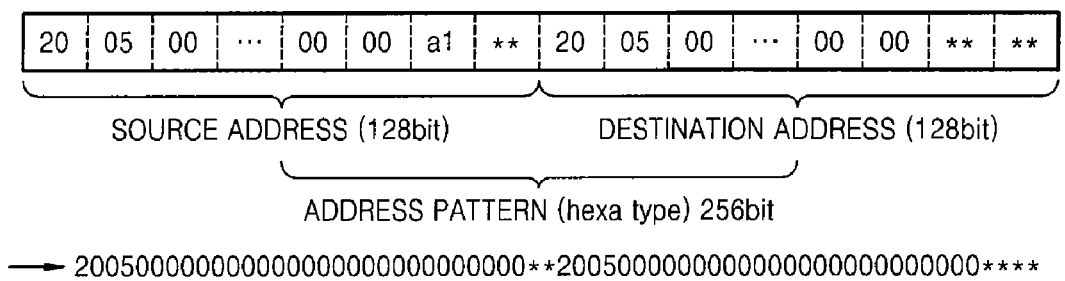

INTRUSION DETECTION APPARATUS AND METHOD USING PATTERNS

CROSS-REFERENCE TO RELATED PATENT APPLICATION

This application claims the benefit of Korean Patent Application No. 10-2006-0072649, filed on Aug. 1, 2006, in the Korean Intellectual Property Office, the disclosure of which is incorporated herein in its entirety by reference.

BACKGROUND OF THE INVENTION

1. Field of the Invention

The present invention relates to a method and apparatus for improving an intrusion detection performance by using a hardware-based content board in a low-cost and low-performance intrusion detection system, and more particularly, to a method and apparatus for performing intrusion detection capable of performing pattern matching including payload matching and Internet protocol (IP) address matching at a low cost by using a commercial hardware-based content board having a low-cost standard interface (for example, a peripheral component interface (PCI)).

2. Description of the Related Art

A high cost, high performance intrusion detection system can maximize performance by implementing an intrusion detection algorithm and other functions in hardware through an application-specific integrated circuit (ASIC) or microcoding. However, since the system incurs an extremely high cost, medium and small companies and small office/home office (SOHO) companies cannot afford it.

Recently, there is a tendency that the intrusion detection system requires a line-speed performance, and products having the performance have been introduced. However, the costs are too high for the medium and small companies and the SOHO companies to buy and use these products. This system implements packet decoding and a matching algorithm into an ASIC and uses a memory such as a Ternary content-addressable memory (TCAM) having a high cost for more rapid matching. Meanwhile, software-based intrusion detection systems have been introduced to a medium and low cost market. However, performance of the system is not satisfactory.

SUMMARY OF THE INVENTION

The present invention provides a method and apparatus for performing intrusion detection capable of using a commercial hardware-based content board having a low-cost standard interface, using regular expressions provided from the content board, and expanding a content matching range to an Internet protocol (IP) address of a packet in addition to a payload of the packet to obtain matching results, thereby rapidly and accurately performing the intrusion detection.

According to an aspect of the present invention, there is provided an intrusion detection apparatus using patterns for performing intrusion detection by receiving indices of matched intrusion detection rules which are results of matching of payload parts and IP (Internet protocol) address parts of packets, comprising: a rule generator classifying intrusion detection rules into rules having content examination parts and rules without content examination parts, granting an index to each of the rules in order to output the indices to a unit for performing the matching and simultaneously store the indices; an extractor extracting payload parts and address parts from the packets and outputting the extracted payload parts and address parts to the unit; and an examination unit examining corresponding rules based on the indices.

According to another aspect of the present invention, there is provided an intrusion detection apparatus using patterns comprising: a content unit having one or more standard interfaces and performing pattern examination on packets input to a system; and an intrusion detection unit generating and providing one or more patterns and indices for rules corresponding to the patterns from intrusion detection rules so as to enable the content unit to perform the pattern examination, and receiving the result of the pattern examination so as to perform a predetermined rule examination, and determining intrusion to the system.

According to another aspect of the present invention, there is provided an intrusion detection method using patterns used in an intrusion detection apparatus using the patterns, comprising: generating one or more patterns and indices for rules corresponding to the patterns from intrusion detection rules, receiving input packets, and extracting payload parts and IP address parts from the input packets; performing pattern examination on the payload parts and the IP address parts of the input packets based on the patterns; and receiving the result of the pattern examination so as to perform predetermined rule examination, and determining intrusion to a system.

BRIEF DESCRIPTION OF THE DRAWINGS

The above and other features and advantages of the present invention will become more apparent by describing in detail exemplary embodiments thereof with reference to the attached drawings in which:

FIG. 6 is a view showing an example of constructing Internet protocol (IP) address patterns used for IP address matching according to an embodiment of the present invention.

DETAILED DESCRIPTION OF THE INVENTION

Figure 1:
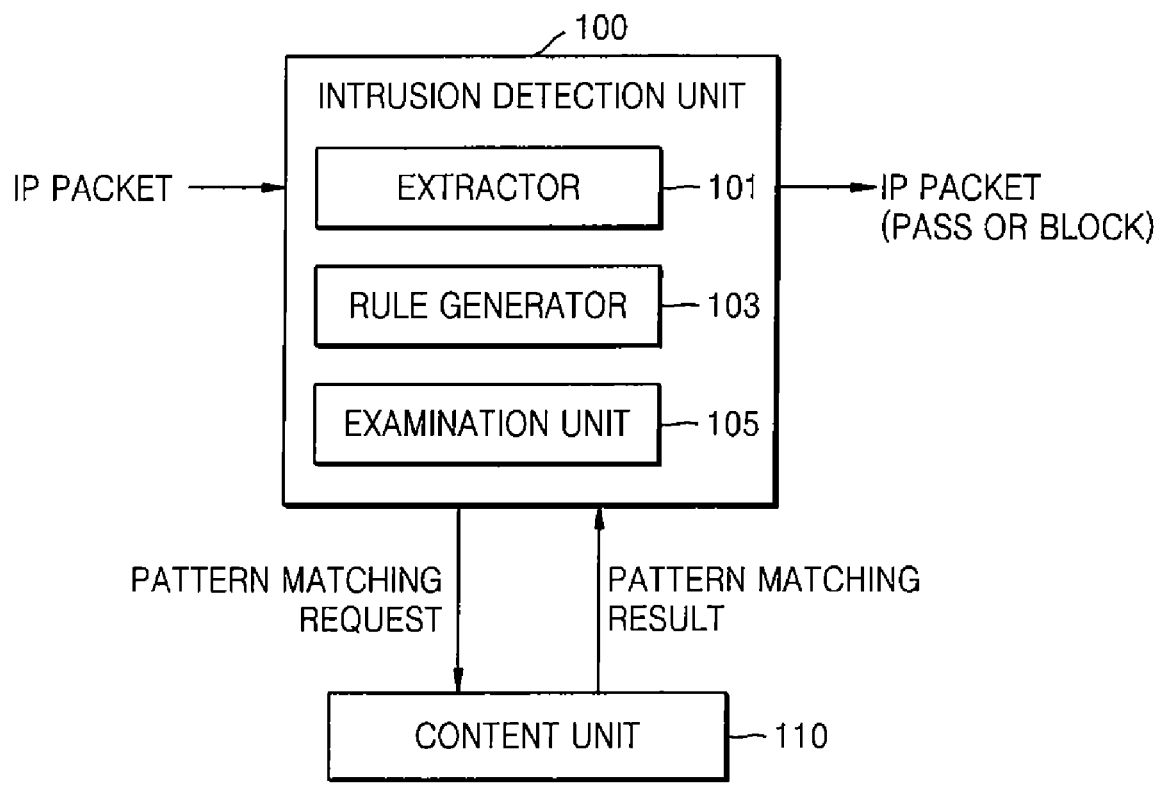
FIG. 1 is a block diagram of an intrusion detection apparatus using patterns according to an embodiment of the present invention.
Figure 2:
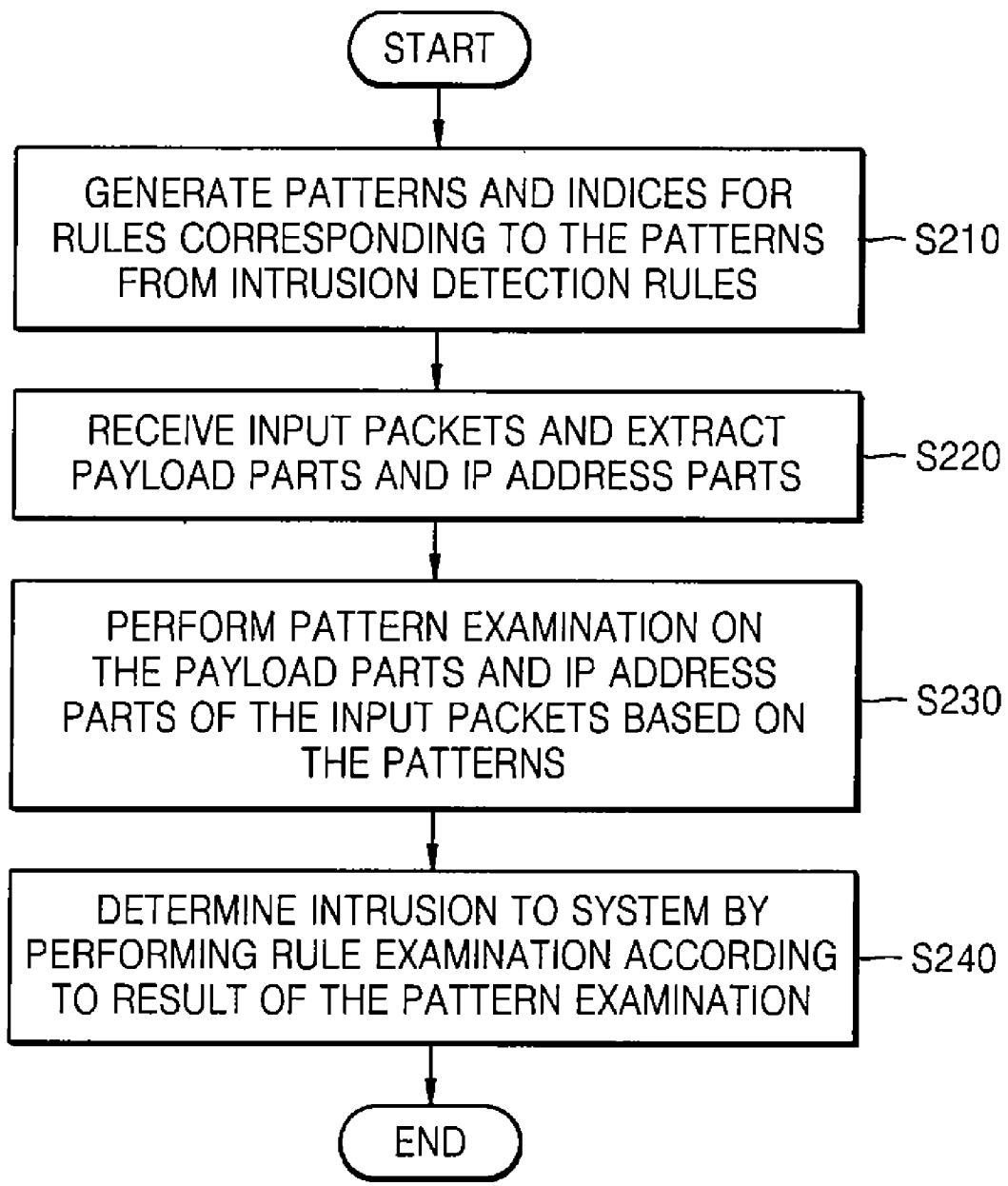
FIG. 2 is a flowchart of an intrusion detection method using patterns according to an embodiment of the present invention.
Figure 3:
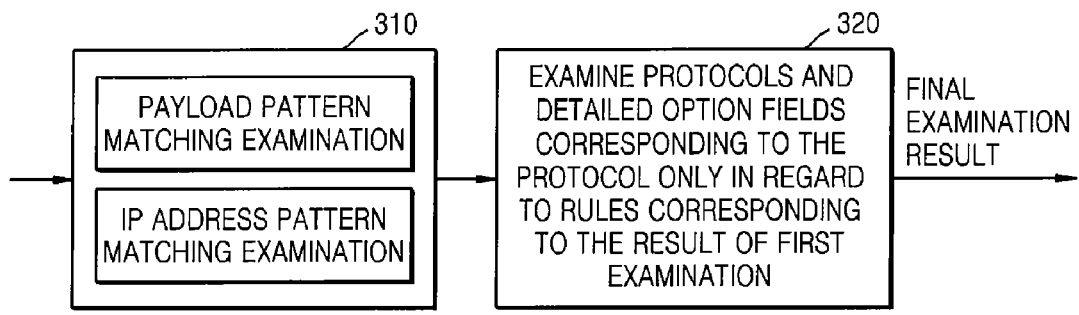
FIG. 3 is a view for conceptually explaining operations of applying intrusion detection rules by using a content board according to an embodiment of the present invention.
Figure 4:
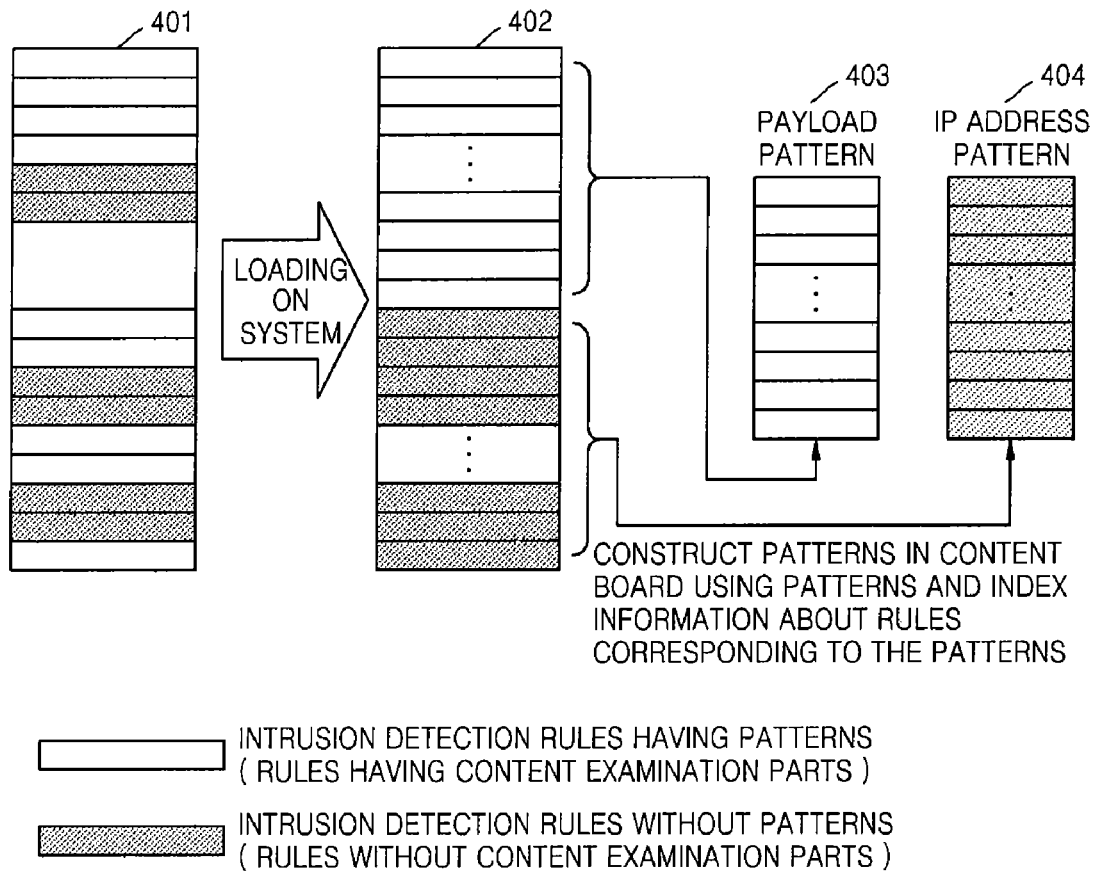
FIG. 4 is a view for conceptually explaining a method of arraying intrusion detection rules and constructing patterns by using the arrayed intrusion detection rules according to an embodiment of the present invention.
Figure 5:
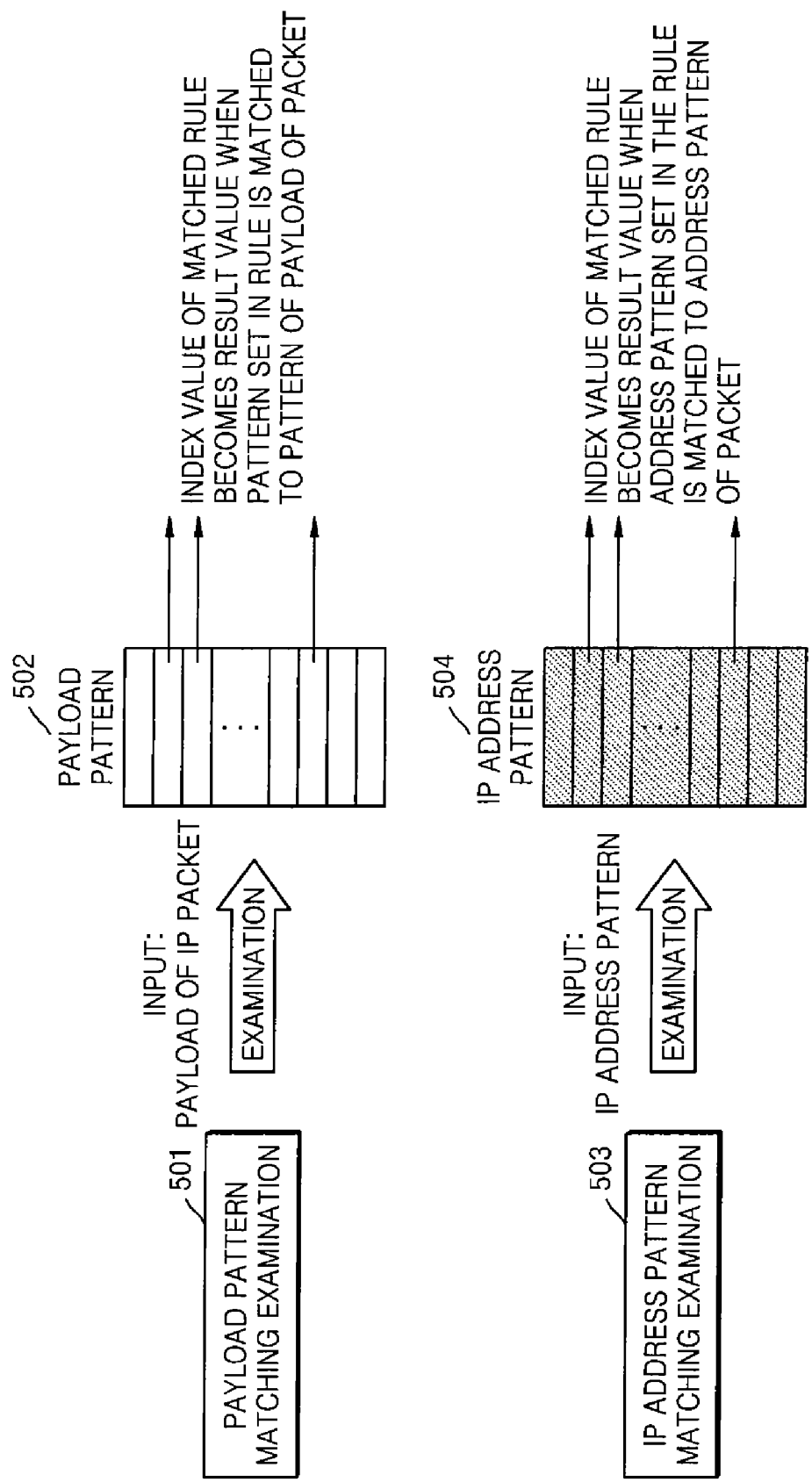
FIG. 5 is a view showing operations of obtaining examination results from pattern information according to an embodiment of the present invention.

Hereinafter, exemplary embodiments of the present invention will be described in detail with reference to the attached drawings. FIG. 1 is a block diagram of an intrusion detection apparatus using patterns according to an embodiment of the present invention. FIG. 2 is a flowchart of an intrusion detection method using patterns according to an embodiment of the present invention. FIG. 3 is a view for conceptually explaining operations of applying intrusion detection rules by using a content board according to an embodiment of the present invention. FIG. 4 is a view for conceptually explaining a method of arraying intrusion detection rules and constructing patterns by using the arrayed intrusion detection rules according to an embodiment of the present invention. FIG. 5 is a view showing operations of obtaining examination results from pattern information according to an embodiment of the present invention. FIG. 6 is a view showing an example of constructing Internet protocol (IP) address patterns used for IP address matching according to an embodiment of the present invention.

Referring to FIG. 1, the intrusion detection apparatus includes a content unit 110 for examining a payload pattern and an IP address pattern, and an intrusion detection unit 100 for examining other detailed fields. Hereinafter, content board and the content unit 110 have the same meaning.

The content unit 110 has an interface specification for connecting a standard interface including a peripheral component interface (PCI) or an application programming interface (API) to the intrusion detection unit 100, and performs pattern examination on packets input to a system. The content unit 110 performs matching of a payload of the input packet and an IP address of the input packet. Data used to detect the matching is provided from the intrusion detection unit 100, and a detailed description thereon will be provided later. According to a result of the detecting of the matching, when the payload is matched or the IP address is matched, respectively, an index of a matched rule is output to the intrusion detection unit 100, and the intrusion detection unit 100 finally determines intrusion.

The intrusion detection unit 100 generates and provides one or more patterns and indices for rules corresponding to the patterns from intrusion detection rules to the content board 110 so as to enable the content board 110 to perform pattern examination, receives a result of the pattern examination so as to enable a predetermined rule examination to be performed, and determines intrusion to the system. More specifically, a rule generator 103 classifies the intrusion detection rules into rules having patterns and rules without patterns, grants an index to each rule to be output to the content unit 110, and simultaneously stores them. Here, the rule generator 103 patternizes an IP address of the rules without the patterns from among the intrusion detection rules. An extractor 101 extracts a payload part and an address part from the packet and outputs the extracted payload and address parts to the content unit 110. An examination unit 105 receives the result of the pattern examination of the content unit 110, performs an examination on corresponding rules, and finally determines the intrusion. In this case, the examination unit 105 examines a protocol and detailed fields including options only on intrusion detection rules which have designated indices provided from the content unit 110 in advance, so that loads are reduced.

The intrusion detection method according to an embodiment of the present invention will now be described with reference to FIG. 2. One or more patterns and indices for rules corresponding to the patterns are generated from the intrusion detection rules. In order to generate the rules and patterns, the intrusion detection rules are classified into rules having patterns, that is, rules having content examination items and rules without patterns, that is, rules without content examination items. Thereafter, an index is granted to each of the classified rules. Here, IP addresses of the rules without patterns from among the intrusion detection rules are patternized. In this case, when the IP address follows an Internet protocol version 4 (IPv4) system, the IP address is patternized so as to have 64 bits including a source address and a destination address and to be applied with a netmask. When the IP address follows an IPv6 system, the IP address is patternized so as to have 256 bits including a source address and a destination address and to be applied with a prefix (operation S210). This will be described with reference to FIG. 6.

Then input packets are received and payload parts and IP address parts are extracted (operation S220). The content unit 110 performs pattern examination on the payload parts and the IP address parts of the input packets based on the pattern and generates a result of the pattern examination as indices (operation S230). This is because both the payload pattern examination and the address pattern examination are performed on all of the packets in the pattern examination process. Last, the intrusion detection unit 100 receives the pattern examination result and performs a predetermined rule examination to determine intrusion to the system. In this case, the intrusion detection unit 100 examines a protocol and detailed fields including options only in regard to intrusion detection rules corresponding to the pattern examination result (operation S240).

Characteristics described above according to the current embodiment of the present invention are provided as compared with a related art. In a general intrusion detection system, all functions are performed in an intrusion detection module. However, according to the embodiment of the present invention, from among functions of the intrusion detection system, pattern matching of a payload of a packet and an examination on an IP address are performed by the content board. Most of the load caused from the intrusion detection functions is generated by pattern matching. Therefore, when the matching function is processed by the additional hardware-based content board, load caused by the intrusion detection functions may be significantly reduced and performance can be improved. Namely, when packets are input to the intrusion detection apparatus, a payload part and an address part of the packet are transmitted to the content unit in order to obtain a matching result, and the intrusion detection unit examines detailed fields including a protocol and options only in regard to rules corresponding to the matching result and performs a final examination.

Referring to FIG. 3, intrusion detection operations according to an embodiment of the present invention are shown in a simplified manner. A first examination operation using the content unit 110, and a second examination operation of examining protocols and detailed option fields corresponding to each protocol only in regard to rules corresponding to a result of the first examination operation are provided. Most intrusion detection systems have thousands or tens of thousands of intrusion detection rules. Applying the rules to all packets in software every time causes a heavy load on the system. Performance can be improved to a certain degree by using an optimal retrieving algorithm, however, applying it in software has a limitation. A low cost method of overcoming this limitation is to use the content board dedicatedly providing pattern matching. A pattern matching time for using a content board is in real time and is deterministic, so that faster examination results can be obtained by using a content board, and a relatively stable performance can be achieved.

The first examination operation 310 has a function of markedly reducing the number of intrusion detection rules to be examined, and through the function, the performance can be improved. Rules filtered through the payload pattern matching from among the rules having patterns, and rules of which addresses are patternized so as to be examined by using the content unit from among the rules without patterns are selected first. In the operation, results are obtained in real time, and the number of rules to be specifically examined is significantly reduced. Thereafter, the detailed operation fields of the rules of which the number reduces through the first examination operation are examined to obtain the final examination result (operation 320).

FIG. 4 shows a method of arraying and patternizing the intrusion detection rules in order to apply the intrusion detection method according to an embodiment of the present invention. In general, intrusion detection rules are described in a file type (operation 401), and when the intrusion detection system is operated, rules are read from the rule file to be used for the pattern examination. Here, according to the current embodiment of the present invention, the intrusion detection rules are classified into the rules having patterns and the rules without patterns in order to be internally stored (operation 402). Here, patterns are picked out from the rules having the patterns and are patternized in order to be used for the content board (operation 403) and are input to the content board.

When the pattern input to the content unit is matched, index information on rules is input along with the pattern in order to know which rule corresponds to the matched pattern. For example, when a sequence in which the intrusion detection rules are arrayed is assumed to be the index, positions corresponding to the sequence and all patterns of the rule are input to the content board. In this way, the content board can refer the complete intrusion detection rule corresponding to the matched pattern when the content board determines matching. When rules do not have the patterns, IP address parts are patternized (operation 404) and input to the content board similarly to the aforementioned operation. By performing this operation, the content board sets information to be matched by the content board to the intrusion detection rules. An operation of patternizing an address is described with reference to FIG. 5.

FIG. 5 shows operations of examining input packets performed by the content unit and generating results according to an embodiment of the present invention. When packets are input, the intrusion detection unit 100 transmits payload parts of the packets to the content unit 110 and performs pattern matching on the payloads (operation 501). The content unit 110 outputs matched information based on the input payloads and set pattern information (operation 502). Here, several matching results can be obtained. This is because although complete forms of intrusion detection rules are different, patterns can be the same. A final examination result is determined in the second examination operation illustrated in FIG. 3 (operation 320).

When the payload matching is finished, the intrusion detection unit 100 transmits IP address parts of the packets to the content board. The content unit performs matching examination based on the input IP addresses and set IP address pattern information (operation 503) and outputs matched information (operation 504). Here, similarly to the aforementioned operation, several matching results can occur. Address information in an intrusion detection rule is set as a range by using a netmask in the IPv4 system, by using a prefix in the IPv6 system. Address information can be set with different options in corresponding address regions, so that several matching results occur. Accordingly, the second examination operation is needed. Examination results generated from the two examinations are reference information about the complete intrusion detection rule. Therefore, after the examinations, the final examination is performed in the second examination operation as illustrated in FIG. 3 only on the rules corresponding to the examination results. Matching information generated in the operations illustrated in FIG. 5 reduces as compared with the number of rules to be examined when being processed in software, so that the examination load on the intrusion detection unit is significantly reduced and this directly causes a performance improvement.

FIG. 6 is a view showing operations of patternizing IP addresses according to an embodiment of the present invention. An IPv4 address and an IPv6 address have difference sizes of generated patterns but have the same patternization operation. When rules without patterns from among the intrusion detection rules are arrayed, only address parts are picked and provided with a source address and a destination address to be patternized. An input address value is represented as a hexadecimal value, and the patterns are constructed with hexadecimal values. In many cases, the addresses are set as ranges. The IPv4 address uses a netmask, and the IPv6 address uses a prefix. Even if any value is allocated to netmask or prefix, it should not cause problems. In FIG. 6, a symbol "*" meaning that it has one-bit and any letter can be applied, is used. However, a corresponding symbol provided to the content board may be used. Consequently, as shown in FIG. 6, the IPv4 address and the IPv6 address may have patterns with 64 bits and 256 bits, respectively.

As described above, the intrusion detection apparatus and method using patterns according to an embodiment of the present invention reduces an overload due to examinations, which are performed on all rules for malicious packets whenever packets are input, so that a processing speed can be increased. Therefore, an implementation of a system having an effective performance and a relatively low cost that can replace a high-cost and high-performance hardware dedicated system is possible.

In addition, an intrusion detection system having a stable performance can be implemented at a very low cost as compared with the high-performance hardware dedicated system. An additional cost is incurred only to provide a hardware-based content board having a standard interface such as a PCI, and easy development is possible by using a high level and low level API provided from a development environment and a content board.

In addition, the development of an effective system against costs is possible due to the rapid rule retrieving method and an improved rule retrieving time provided by an embodiment of the present invention.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An intrusion detection apparatus using patterns, comprising:
    an extraction unit configured to extract from input packets payloads and IP addresses;
    a rule generation unit configured to classify a plurality of intrusion detection rules as first intrusion detection rules having patterns in payload parts and second intrusion detection rules without patterns in the payload parts, and further configured to generate first patterns corresponding to the first intrusion detection rules based on the patterns contained in the payload parts and second patterns corresponding to the second intrusion detection rules based on IP addresses included in the second intrusion detection rules;

a content unit configured to perform a pattern-based examination by comparing the first patterns and the second patterns provided from the rule generating unit with the payloads and the IP addresses of the input packets provided from the extraction unit respectively, to select input packets matching with the first patterns or the second patterns; and an examination unit configured to perform a rule examination on the selected input packets by comparing the first and the second intrusion detection rules with the payloads and the IP addresses of the selected input packets.

2. The intrusion detection apparatus of claim 1, wherein the rule generation unit is configured to classify the second intrusion detection rules as having patterns of 64 bits based on a source address and a destination address when the IP addresses included in the second intrusion detection rules are Ipv4 addresses.

3. The intrusion detection apparatus of claim 1, wherein the rule generation unit is configured to classify the second intrusion detection rules as having patterns of 256 bits based on a source address and a destination address when the IP addresses included in the second intrusion detection rules are Ipv6 addresses.

4. The intrusion detection apparatus of claim 1, wherein the content unit is a hardware-based unit separated from the examination unit and having a PCI (peripheral component interface) or an API (application programming interface) as an interface to the examination unit.

5. The intrusion detection apparatus of claim 1, wherein the first patterns are different from each other for each first intrusion detection rule, wherein the second patterns are different from each other for each second intrusion detection rule.

6. The intrusion detection apparatus of claim 1, wherein the rule generation unit is configured to grant predetermined index values which associate the first intrusion detection rules and the second intrusion detection rules with the first patterns and the second patterns, respectively, and wherein the content unit is configured to provide index values associated with the first or the second patterns matching with the selected input packets to the examination unit.

7. The intrusion detection apparatus of claim 1, wherein the rule examination includes comparing protocols and detailed fields of the selected input packets with the first and the second intrusion detection rules.

8. The intrusion detection apparatus of claim 1, wherein the pattern-based examination performed by the content unit results in a plurality of provisional matching results with respect to a given input packet, and wherein the rule examination performed by the examination unit singles out one final matching result from the plurality of provisional matching results.

9. An intrusion detection method using patterns, comprising:

classifying a plurality of intrusion detection rules as first intrusion detection rules having patterns in payload parts and second intrusion detection rules without patterns in the payload parts;

generate first patterns corresponding to the first intrusion detection rules based on the patterns in the payload parts;

patternizing the second intrusion detection rules based on IP addresses included in the second intrusion detection rules to generate second patterns corresponding to the second intrusion detection rules;

extracting from input packets payloads and IP addresses;

performing a pattern-based examination by comparing the first patterns with the payloads of the input packets and comparing the second patterns with the IP addresses of the input packets to select input packets matching with the first patterns or the second patterns; and performing a rule-examination on the selected input packets by comparing the first and the second intrusion detection rules with the payloads and the IP addresses of the selected input packets.

10. The intrusion detection method of claim 9, further comprising granting index values to each of the first intrusion detection rules and the second intrusion detection rules so as to associate the first intrusion detection rules and the second intrusion detection rules with the first patterns and the second patterns, respectively.

11. The intrusion detection method of claim 9, wherein the pattern-based examination is performed separately from the rule examination using a hardware board having a PCI or an API as a standard interface.

12. The method of claim 9, wherein the rule examination includes comparing protocols and detailed fields of the selected input packets with the first and the second intrusion detection rules.

13. The method of claim 9, wherein the pattern-based examination performed by the content unit results in a plurality of provisional matching results with respect to a given input packet, and wherein the rule examination performed by the examination unit singles out one final matching result from the plurality of provisional matching results.

* * * * *